Patented Feb. 24, 1953

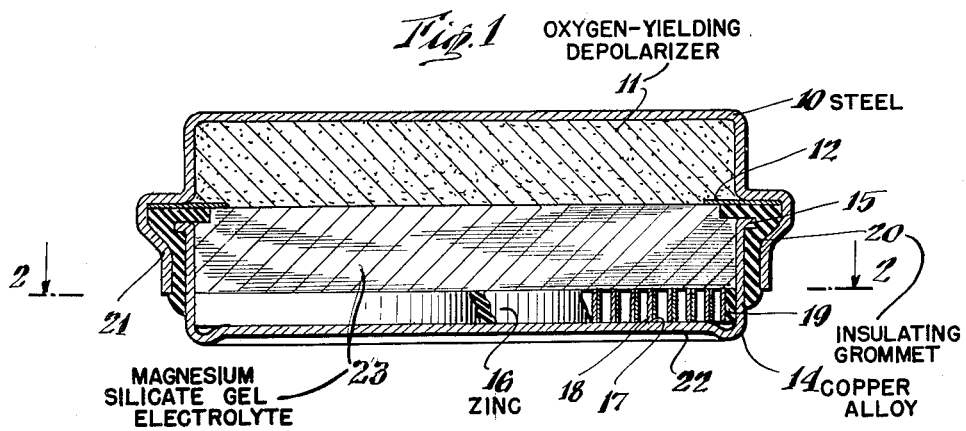
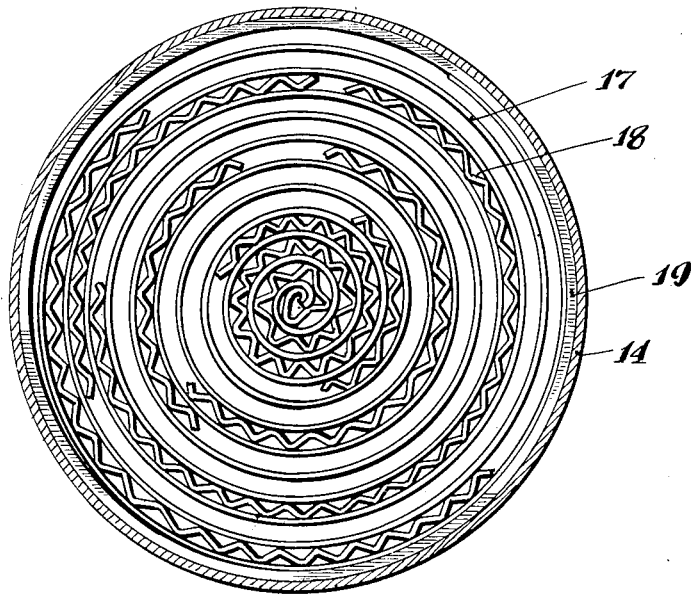

2,629,758

UNITED STATES PATENT OFFICE 2,629,758

ELECTRIC CURRENT PRODUCING CELL AND ELECTROLYTE THEREFOR

Samuel Ruben, New Rochelle, N. Y.

Application December 19, 1950, Serial No. 201,557

15 Claims. (Cl. 136—107)

This invention relates to electric current producing cells, and, more particularly, to alkaline dry cells and to an improved electrolyte for such cells.

The present application is a continuation-in-part of my co-pending application Serial No. 631,402, filed November 28, 1945, now Patent No. 2,536,696, issued January 2, 1951.

It is an object of the present invention to improve cells of the described character.

It is another object of the present invention to provide a novel and improved alkaline dry cell characterized by an immobilized electrolyte in the form of a hydrogel which is completely free from organic materials.

Other and further objects and advantages of the present invention will become apparent from the following description, taken in conjunction with the accompanying drawing, in which Fig. 1 is a vertical sectional view of a cell embodying the principles of the present invention; and Fig. 2 is a horizontal section of the anode container or shell of the cell with a honeycomb-type anode therein, taken on line 2—2 of Fig. 1.

Considered broadly, the present invention comprises an electric current producing cell, specifically an alkaline dry primary cell, having an amalgamated zinc anode; a cathode of a depolarizer material including an electrolytically reducible oxygen-yielding compound, such as electrolytically reducible metal oxides and permanganates; and an alkaline electrolyte, such as an aqueous solution of an alkali metal hydroxide, preferably one initially containing a substantial quantity of dissolved zinc. In accordance with the invention, the electrolyte is immobilized by admixture of a suitable quantity of magnesium silicate thereto and heating the mixture at a slightly elevated temperature for a suitable period. This procedure converts the electrolyte from a suspension into a translucent gel having a substantially solid consistency which is highly conductive and which does not separate or flow with heat or separate gravimetrically. The resulting gel is capable of functioning both as a spacer maintaining the anode and cathode at the proper distance and also as a barrier, preventing free circulation of the electrolyte and migration of deleterious substances from one electrode to the other. A gel electrolyte of the described type has the important advantage of being free from organic materials which can be oxidized. Therefore, the inorganic gel electrolyte of the invention will operate satisfactorily even in combination with depolarizers of high oxidizing value, such as the permanganates.

Referring now to Figs. 1 and 2 of the drawing, reference numeral 10 denotes a shallow cup-shaped cathode container or shell formed of a suitable inert metal, such as steel. Within this container, there is compressed cathode-depolarizer body 11 comprising an electronically conducting, electrolytically reducible oxygen-yielding compound having a smaller quantity of inert material of higher conductivity admixed thereto. The cathode body may be in the form of a pre-pressed pellet of 95% mercuric oxide and 5% graphite which is inserted into the cathode container and is consolidated therein by a higher pressure. Upon the lower surface of cathode body 11 rests an insulative ring or washer 12 of styrene.

Anode container 14 is in the form of a shallow cup having an outwardly flaring flange 15 at its edge and preferably formed of a metal inert to the electrolyte and having, when amalgamated, a low contact potential to zinc. Examples of suitable materials for the anode container are copper, silver-plated copper, silver and alloys of copper or silver with other metals, or tinned steel. Particularly good results are obtained with anode containers formed of commercial bronze which is an alloy of 90% copper and 10% zinc. Before assembling the cell, the inner surface of bronze can 14 is amalgamated, for example by pouring into it an acidified 3% mercuric nitrate solution, or by introducing metallic mercury in an amount equal to 15% of the zinc anode weight. Upon contact of the zinc anode with the anode can, when the electrolyte is added, amalgamation of the inner anode can surface and of the anode immediately occurs, forming an amalgam bond between can and anode.

The anode generally denoted by reference numeral 16, is provided in the form of a disc-shaped member characterized by a honeycomb structure having a large number of small openings or channels extending through the thickness thereof. As it will best appear from Fig. 2, a structure of this type may be obtained by spirally winding up a plane zinc strip 17 together with a corrugated zinc strip 18. The wound structure is held together by means of a zinc sleeve 19, or may be inserted into the can in the absence of a confining sleeve and allowed to expand therein as a result of its resiliency. For example, in a practical cell, the structure was built up from plane and corrugated zinc strips having a thickness of 0.01" and a width of 0.1".

The corrugated strip was provided with 11 corrugations per linear inch, each corrugation being 0.06" deep, and the diameter of the finished anode disc was determined in accordance with the cell dimensions. Of course, a similar honeycomb structure characterized by a large number of closely spaced channels extending through the thickness thereof and by a high surface to volume ratio may be obtained by other procedures, such as by die casting, extruding from zinc sheet, coining from a zinc slug, or by powder metallurgical methods. Before assembling the honeycomb anode with the cell, it is amalgamated in a 3% mercuric nitrate solution and is washed and dried. The amalgamated anode is then inserted into anode container or shell 14, placed with its open end up. It is also possible, however, to carry out amalgamation of the anode by contacting it with metallic mercury in the anode container, in the presence of the electrolyte, in accordance with the procedure described in the foregoing.

The preferred alkali metal hydroxide electrolyte consists of an aqueous solution of potassium hydroxide initially containing in solution a substantial quantity of zinc in the form of a compound or compounds commonly called "zincates." The preferred range of concentration of the potassium hydroxide in the electrolyte is from thirty to fifty per cent KOH.

For minimum attack on the amalgamated zinc anode by the electrolyte when the cell is standing on open circuit, the electrolyte should contain all the zinc it will take up at the temperature to which the cell is to be subjected. However, I have found that proportions of zincate down to about one-half this optimum concentration will, in many cases, particularly for moderate temperature uses, produce only minute gas generation, the rate being sufficiently slow to permit generated gas to diffuse out of the cell through the grommet or other sealing means without deleteriously affecting the desired airtight enclosure of the internal cell elements. The quantity of zinc which will dissolve in the electrolytes appears to be proportional to the alkali concentration. It is preferred that the electrolyte shall contain about from ten to twenty grams of zinc for each hundred grams of KOH present. The best range for electrolytes containing thirty to fifty per cent KOH is about fifteen to seventeen grams of zinc per one hundred grams of KOH. In the preparation of the electrolyte, the zinc is preferably added in the form of zinc oxide.

Although a potassium hydroxide electrolyte is preferred, the present invention contemplates within its scope the possible use of other alkali metal hydroxide electrolytes, such as sodium hydroxide, lithium hydroxide and mixtures of such hydroxides.

The electrolyte is converted into an inorganic gel by heating a mixture of 15 to 20 grams of magnesium silicate and 100 grams of the alkaline electrolyte to a temperature between 120 and 125° C. for 15 minutes. If lower temperatures are used, longer heating periods are required, such as, for example, 4 hours at 80° C. As a practical example, excellent results are obtained by heating 20 grams of magnesium silicate and 100 grams of an electrolyte containing 100 grams of KOH and 16 grams of dissolved zinc in 100 milliliters of water at 125° C. for 15 minutes in a suitable container.

The gel thus produced having a substantially self-sustaining consistency is then transferred into anode shell 14 by a spatula or other suitable means and completely fills the same, including the interstices of the honeycomb anode 16. Sealing and insulating grommet 20 of polyethylene or other suitable insulating material is placed around the outwardly flared edge 15 of anode shell 14 and the anode subassembly is then secured to a cathode subassembly comprising cathode shell 10, cathode depolarizer body 11 and styrene ring 19 by means of radially crimping the mouth portions of the cathode shell 10 together at 21, resulting in a crimp seal.

After the cell has been completely assembled, a cylindrical tool having a smooth and plane pressure face and a diameter about 0.06 inch smaller than that of the bottom surface of the anode shell 14 is pressed against the originally plane bottom surface of the said shell. This will result in the slightly dished shape of the bottom wall of the said anode shell shown at 22 in the drawing. The depression of the dished portion of the bottom wall is quite small, generally in the order of only 0.02 inch, nevertheless, it is sufficient to cause moderate compression of the internal cell elements, thereby insuring good electrical contact of the anode and cathode with the interposed body 23 of electrolyte gel throughout the useful life of the cell.

Prior to assembly of the cell, it is desirable to impregnate cathode element 11 with liquid electrolyte.

While the present invention has been disclosed in connection with a preferred embodiment thereof, variations and modifications may be resorted to by those skilled in the art without departing from the principles of the invention. Thus, the cathode may be formed from a great variety of different depolarizer materials comprising an electrolytically-reducible oxygen-yielding compound. Suitable compounds are, for example, mercuric or mercurous oxide, the oxide or peroxide of silver, cupric or cuprous oxide, potassium permanganate or another alkali metal permanganate, calcium permanganate or another alkaline earth metal permanganate, silver permanganate and copper permanganate. Various anode structures other than the honeycomb-type anode described in the foregoing may be used with equal or similar results, such as particularly the anode structures disclosed in my co-pending application Serial No. 674,588, filed June 5, 1946, now Patent No. 2,542,574, issued February 20, 1951, and in my co-pending application Serial No. 60,265, filed November 16, 1948.

What is claimed is:

1. An alkaline dry cell comprising an anode of amalgamated zinc, a cathode of depolarizer material, and an immobilized electrolyte body in contact with said anode and cathode, said body comprising a gel of an alkali metal hydroxide solution and magnesium silicate.

2. An alkaline dry cell comprising an anode of amalgamated zinc, a cathode including an electrolytically-reducible oxygen-yielding compound, and an immobilized electrolyte body in contact with said anode and cathode and comprising a potassium hydroxide solution and magnesium silicate, said electrolyte body having such consistency as to perform the combined functions of electrode spacer and barrier element.

3. An alkaline dry cell comprising an amalgamated zinc anode, a cathode including a major amount of an electrolytically-reducible oxygen-yielding compound and a minor amount of finely divided inert material of higher conductivity intimately mixed therewith, and an immobilized electrolyte body in contact with said anode and cathode and comprising an alkali metal hydroxide solution containing dissolved zinc and magnesium silicate.

4. An alkaline dry cell comprising an amalgamated zinc anode, a cathode including a major portion of mercuric oxide and a minor portion of graphite intimately mixed therewith, and a gelled electrolyte body in contact with said anode and cathode and comprising a potassium hydroxide solution containing potassium zincate and magnesium silicate.

5. An alkaline dry cell comprising an anode terminal, an amalgamated zinc anode having a large number of apertures therein in contact with said anode terminal, a cathode terminal, a cathode of depolarizer material in contact with said cathode terminal, at least one of said terminals being in the form of a metal shell, an immobilized electrolyte body in contact with said anode and cathode and substantially embedding said anode, said electrolyte comprising a gel of potassium hydroxide and magnesium silicate, and an insulating sealing member compressed between cooperating portions of said terminals and defining therewith a sealed enclosure for said cell.

6. An alkaline dry cell comprising an anode and a cathode shell, an amalgamated zinc anode having a large number of apertures therein in said anode shell, a cathode of oxygen-yielding depolarizer material compressed in said cathode shell, an immobilized electrolyte body in contact with said anode and said cathode and substantially embedding said anode, said electrolyte body comprising a gel of potassium hydroxide and magnesium silicate, and an insulating sealing member compressed between cooperating portions of said shells and defining therewith a sealed enclosure for said cell.

7. An electrolyte for electric current producing cells which comprises an alkali metal hydroxide and magnesium silicate.

8. An electrolyte for alkaline dry cells which comprises a gel of an alkali metal hydroxide and magnesium silicate.

9. An electrolyte for alkaline dry cells which comprises a gel of potassium hydroxide and magnesium silicate.

10. An electrolyte for alkaline dry cells which comprises a gel formed of an aqueous potassium hydroxide solution containing substantial amounts of potassium zincate gelled with magnesium silicate.

11. An electrolyte for alkaline dry cells which prises an inorganic gel of potassium hydroxide and magnesium silicate containing about 15 to about 20 parts by weight of magnesium silicate per 100 parts by weight of the gel.

12. An electrolyte for electric current producing cells comprising a gelled, gravimetrically non-separating, self-sustaining composition of an alkali metal hydroxide and magnesium silicate.

13. The method of making an electrolyte for electric current producing cells which comprises forming a mixture of an aqueous solution of an alkali metal hydroxide with a minor amount of magnesium silicate, and heating the mixture at a temperature between 80 and 125° C. for a period sufficient to convert the mixture into a gel.

14. The method of making an electrolyte for alkaline dry cells which comprises forming a mixture of about 15 to about 20 parts by weight of magnesium silicate and of about 100 parts by weight of an aqueous potassium hydroxide solution containing 30 to 50 grams of KOH per 100 grams of solution, and heating the mixture to convert it into a gel.

15. The method of making an electrolyte for alkaline dry cells which comprises forming a mixture of a minor amount of magnesium silicate with a major amount of an aqueous solution of potassium hydroxide containing substantial quantities of dissolved zinc, and heating the mixture at a temperature in the order of 125° C. for a period sufficient to convert the mixture to a gel, the quantity of magnesium silicate being in the order of 20% by weight of the gel.

SAMUEL RUBEN.

REFERENCES CITED

The following references are of record in the file of this patent:

UNITED STATES PATENTS

| Number | Name | Date |
| --- | --- | --- |
| 858,862 | Edison | July 2, 1907 |
| 1,541,699 | Freeth et al. | June 9, 1925 |
| 1,695,667 | Schuster | Dec. 18, 1928 |
| 2,526,101 | West | Oct. 17, 1950 |

FOREIGN PATENTS

| Number | Country | Date |
| --- | --- | --- |
| 201,794 | Great Britain | Aug. 9, 1923 |